(12) United States Patent
Wu et al.

(10) Patent No.: US 12,066,520 B2
(45) Date of Patent: Aug. 20, 2024

(54) RADAR COMMUNICATIONS WITH DISPARATE PULSE REPETITION INTERVALS

(71) Applicant: NXP B.V., Eindhoven (NL)

(72) Inventors: Ryan Haoyun Wu, San Jose, CA (US); Dongyin Ren, East Brunswick, NJ (US); Wendi Zhang, Munich (DE); René Geraets, Best (NL)

(73) Assignee: NXP B.V., Eindhoven (NL)

( * ) Notice: Subject to any disclaimer, the term of this patent is extended or adjusted under 35 U.S.C. 154(b) by 98 days.

(21) Appl. No.: 17/233,952

(22) Filed: Apr. 19, 2021

(65) Prior Publication Data

US 2022/0334240 A1  Oct. 20, 2022

(51) Int. Cl.
G01S 13/58 (2006.01)
G01S 7/292 (2006.01)

(52) U.S. Cl.
CPC .......... G01S 13/581 (2013.01); G01S 7/2923 (2013.01)

(58) Field of Classification Search
CPC .... G01S 13/581; G01S 7/2923; G01S 7/0235; G01S 7/03; G01S 7/288; G01S 7/292; G01S 7/4021; G01S 13/22; G01S 13/282; G01S 13/343; G01S 13/582; G01S 13/878; G01S 13/931; G01S 13/42
See application file for complete search history.

(56) References Cited

U.S. PATENT DOCUMENTS 3,831,174 A * 8/1974 King et al.
3,935,572 A    1/1976 Broniwitz et al.
5,276,453 A    1/1994 Heymsfield et al.
7,400,290 B2   7/2008 Woodington et al.
10,205,457 B1  2/2019 Josefsberg et al.
11,402,483 B2  8/2022 Long et al.
2008/0278371 A1 * 11/2008 Holmberg ............... G01S 7/285
                                                       342/26 B
2013/0188167 A1 7/2013 Halmos
(Continued)

FOREIGN PATENT DOCUMENTS

WO    WO-2021189268    9/2021

OTHER PUBLICATIONS

J. Bechter, F. Roos and C. Waldschmidt, "Compensation of Motion-Induced Phase Errors in TDM MIMO Radars," in IEEE Microwave and Wireless Components Letters, vol. 27, No. 12, pp. 1164-1166, Dec. 2017.

(Continued)

*Primary Examiner* — Bernarr E Gregory
*Assistant Examiner* — Juliana Cross

(57) ABSTRACT

Aspects of the present disclosure are directed to radar communications with disparate pulse repetition intervals, as may be implemented with radar transmission, receiver and processing circuitry. As may be utilized in accordance with one or more embodiments herein, time division multiplexing (TDM) multi-input multi-output (MIMO) radar signals are transmitted by transmitting sets of successive radar signals, each set having a pulse repetition interval (PRI) that is different than the PRI of sets of radar signals transmitted in another one of the sets. Positional characteristics of a target may be ascertained based on the PRI used in each of the sets and on phase characteristics of ones of the radar signals reflected from the target.

8 Claims, 6 Drawing Sheets

(56) References Cited

U.S. PATENT DOCUMENTS

| | | | |
|---|---|---|---|
| 2016/0131752 A1 | 5/2016 | Jansen et al. | |
| 2018/0011170 A1* | 1/2018 | Rao | G01S 13/92 |
| 2019/0242973 A1 | 8/2019 | Schat et al. | |
| 2020/0011968 A1 | 1/2020 | Hammes et al. | |
| 2020/0025906 A1* | 1/2020 | Kesaraju | G01S 13/589 |
| 2020/0081110 A1 | 3/2020 | Nam et al. | |
| 2020/0103515 A1* | 4/2020 | Kishigami | G01S 7/4026 |
| 2020/0158861 A1 | 5/2020 | Cattle et al. | |
| 2020/0166598 A1* | 5/2020 | Dorn | H04W 4/029 |
| 2020/0233076 A1* | 7/2020 | Chen | G01S 7/4865 |
| 2020/0284874 A1 | 9/2020 | Narayana Moorthy et al. | |
| 2020/0393553 A1* | 12/2020 | Kishigami | G01S 7/036 |
| 2021/0026003 A1 | 1/2021 | Panzer et al. | |
| 2021/0156980 A1 | 5/2021 | Stettiner et al. | |
| 2021/0156981 A1 | 5/2021 | Stettiner et al. | |
| 2021/0156982 A1 | 5/2021 | Stettiner et al. | |
| 2021/0229662 A1* | 7/2021 | Ozbilgin | |
| 2021/0333386 A1* | 10/2021 | Park | G01S 13/584 |
| 2022/0099795 A1 | 3/2022 | Crouch et al. | |
| 2022/0099837 A1 | 3/2022 | Crouch et al. | |
| 2022/0283286 A1* | 9/2022 | Wu | G01S 13/931 |
| 2022/0342036 A1 | 10/2022 | Rao et al. | |
| 2022/0413132 A1* | 12/2022 | Hasegawa | G01S 7/4021 |

OTHER PUBLICATIONS

M. Kronauge, C. Schroeder and H. Rohling, "Radar target detection and Doppler ambiguity resolution," 11th International Radar Symposium, Vilnius, Lithuania, 2010, pp. 1-4.

M. Musa and S. Salous, "Ambiguity elimination in HF FMCW radar systems," in IEE Proceedings—Radar, Sonar and Navigation, vol. 147, Issue 4, pp. 182-188, Aug. 2000.

K. Thurn, D. Shmakov, G. Li, S. Max, M. Meinecke and M. Vossiek, "Concept and Implementation of a PLL-Controlled Interlaced Chirp Sequence Radar for Optimized Range—Doppler Measurements," in IEEE Transactions on Microwave Theory and Techniques, vol. 64, No. 10, pp. 3280-3289, Oct. 2016.

U.S. Appl. No. 17/186,750, filed Feb. 26, 2021, entitled: Radar Communications With Offset Chirp Interval Time. The Examiner is referred to the copending patent prosecution of the common Applicant (no attachment).

U.S. Appl. No. 17/187,789, filed Feb. 27, 2021, entitled: Method and System for Time Division Multiplexing MIMO Radar Doppler Compensation Using Spurious Angle Spectrum Hypothesis Tests . The Examiner is referred to the copending patent prosecution of the common Applicant (no attachment).

Nijsure, Yogesh et al., "Cognitive Chaotic UWB-MIMO Radar Based on Nonparametric Bayesian Technique", IEEE Transactions on Aerospace and Electronic Systems, Jul. 1, 2015, pp. 2360-2378, vol. 51, No. 3, IEEE, Piscataway, NJ, USA.

Shapir, I et al., "Doppler Ambiguity Resolving in TDMA Automotive MIMO Radar via Digital Multiple PRF", 2018 IEEE Radar Conference (Radarconf18), Apr. 23, 2018, pp. 175-180, IEEE, Piscataway, NJ, USA.

Guetlein, Johanna et al., "Motion Compensation for a TDM FMCW MIMO Radar System", Proceedings of the 10th European Radar Conference, Oct. 9, 2013, pp. 37-40, IEEE, Piscataway, NJ, USA.

Roos, Fabian et al., "Enhancement of Doppler Unambiguity for Chirp-Sequence Modulated TDM-MIMO Radars", 2018 IEEE MTT-S International Conference on Microwaves for Intelligent Mobility (ICMIM), Apr. 15, 2018, pp. 1-4, IEEE, Piscataway, NJ, USA.

Schmid, C.M. et al; "Motion Compensation and Efficient Array Design for TDMA FMCW MIMO Radar Systems" 2012 6th European Conference on Antennas and Propagation; pp. 1746-1750 (2012).

Non Final Office Action; U.S. Appl. No. 17/186,750; 50 pages (Apr. 10, 2023).

Non Final Office Action; U.S. Appl. No. 17/187,789; 49 pages (May 18, 2023).

* cited by examiner

RADAR COMMUNICATIONS WITH DISPARATE PULSE REPETITION INTERVALS

OVERVIEW

Aspects of various embodiments are directed to radar communications involving the use of disparate pulse repetition intervals for respective transmitters.

A variety of radar communications may be utilized for many different applications. For instance, such communications may utilize Time Division Multiplexing (TDM) linear-chirp waveforms, with mm-Wave Frequency Modulation Continuous Wave (FMCW) automotive radar systems for constructing multiple-in-multiple-out (MIMO) virtual aperture to achieve higher angular resolution. The TDM approach may facilitate MIMO transmission as well as the processing of received signals, which may lead to lower cost and effective implementations.

While TDM radar signaling can be useful, time multiplexing of chirps transmitted by different transmitter antennas may result in mismatched phase delays, as may be caused by motion of targets. Further complications may be presented during TDM MIMO operation in which the MIMO transmitters are transmitting at different times, with relative motion between radar and the targets. For instance, between any two transmitting periods, the movement of the target may result in a change in the distance to the radar's phase center. This change in distance translates to change in the round-trip phase delay of the return signals, causing phase offsets across the subsequent transmission periods. Compensating for such mismatched phase delays can be particularly challenging. These and other matters have presented challenges to radar implementations, for a variety of applications.

SUMMARY

Various example embodiments are directed to issues such as those addressed above and/or others which may become apparent from the following disclosure concerning radar signal processing and related determination of positional characteristics of a target or targets.

In certain example embodiments, aspects of the present disclosure involve utilizing radar signals, each having a disparate pulse repetition interval (PRI), utilizing the disparate PRIs to resolve positional characteristics. Such an approach can be useful, for example, in addressing issues as noted above and, for example, as may apply to ascertaining the position of moving targets as may produce undesirable phase offset errors.

In accordance with a more particular embodiment, an apparatus includes transmission, receiver and processing circuitry. The transmission circuitry is to transmit time division multiplexing (TDM) multi-input multi-output (MIMO) radar signals by transmitting sets of successive radar signals, each set having a pulse repetition interval (PRI) that is different than the PRI of sets of radar signals transmitted in another one of the sets. The receiver circuitry is to receive ones of the radar signals reflected from a target. The processing circuitry is to ascertain positional characteristics of the target based on the PRI used in each of the sets and on phase characteristics of the ones of the radar signals reflected from the target and received via the receiver circuitry.

Another embodiment is directed to a method as follows. Time division multiplexing (TDM) multi-input multi-output (MIMO) radar signals are transmitted by transmitting sets of successive radar signals, each set having a pulse repetition interval (PRI) that is different than the PRI of sets of radar signals transmitted in another one of the sets. Positional characteristics of a target are ascertained based on the PRI used in each of the sets and on phase characteristics of ones of the radar signals reflected from the target.

The above discussion/summary is not intended to describe each embodiment or every implementation of the present disclosure. The figures and detailed description that follow also exemplify various embodiments.

BRIEF DESCRIPTION OF FIGURES

Various example embodiments may be more completely understood in consideration of the following detailed description in connection with the accompanying drawings, in which.

Figure 1:
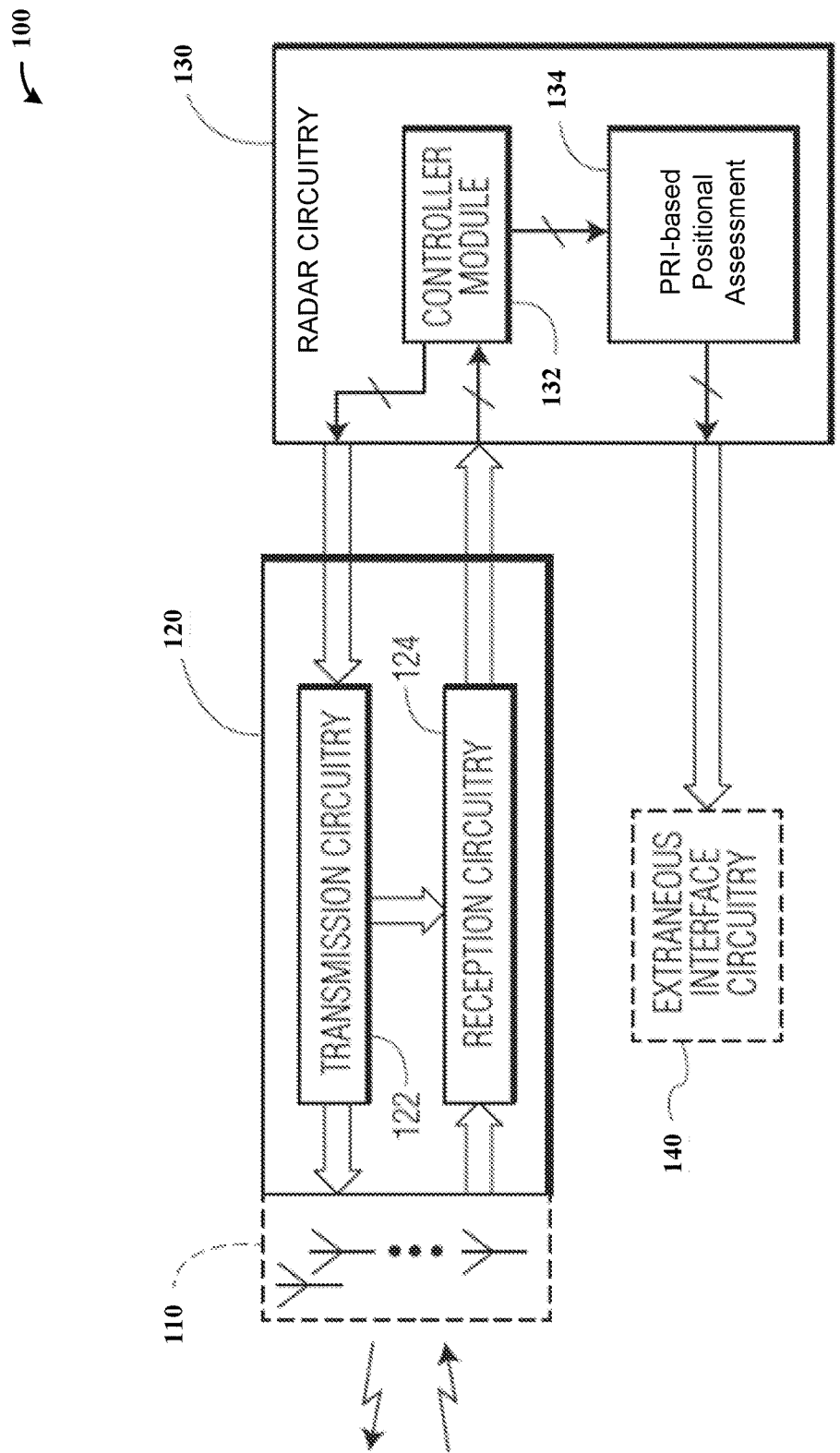
FIG. 1 is a system-level diagram illustrating an example radar communications system/apparatus, in accordance with the present disclosure.

While various embodiments discussed herein are amenable to modifications and alternative forms, aspects thereof have been shown by way of example in the drawings and will be described in detail. It should be understood, however, that the intention is not to limit the disclosure to the particular embodiments described. On the contrary, the intention is to cover all modifications, equivalents, and alternatives falling within the scope of the disclosure including aspects defined in the claims. In addition, the term "example" as used throughout this application is only by way of illustration, and not limitation.

DETAILED DESCRIPTION

Aspects of the present disclosure are believed to be applicable to a variety of different types of apparatuses, systems and methods involving radar communications and utilization for ascertaining positional characteristics of one or more targets in an environment. In certain implementations, aspects of the present disclosure have been shown to be beneficial when used in the context of automotive radar, including radar signal processing circuitry. In some embodiments, distinct PRIs are used for transmitting respective sets of radar signals, the reflections of which are detected and used with their respective PRIs to compensate for phase ambiguities. Such approaches may enhance radar accuracy, for instance in an automotive environment in which targets and/or an automobile employing radar circuitry is moving. While not necessarily so limited, various aspects may be appreciated through the following discussion of non-limiting examples which use exemplary contexts.

Accordingly, in the following description various specific details are set forth to describe specific examples presented herein. It should be apparent to one skilled in the art, however, that one or more other examples and/or variations of these examples may be practiced without all the specific details given below. In other instances, well known features have not been described in detail so as not to obscure the description of the examples herein. For ease of illustration, the same reference numerals may be used in different diagrams to refer to the same elements or additional instances of the same element. Also, although aspects and features may in some cases be described in individual figures, it will be appreciated that features from one figure or embodiment can be combined with features of another figure or embodiment even though the combination is not explicitly shown or explicitly described as a combination.

Various aspects of the disclosure are directed to resolving Doppler ambiguity and multiple-in-multiple-out (MIMO) array phase compensation problems that may be present in Time Division Multiplexing (TDM) MIMO radars. TDM is a MIMO waveform that may be used in mm-Wave Frequency Modulation Continuous Wave (FMCW) automotive radars for constructing a virtual aperture to achieve high angular resolution. Aspects of the disclosure are directed to mitigating effects of mismatched phase delays as may be present with time multiplexing when there is relative motion between targets and radar. Such approaches may involve resolving unambiguous radial velocity via estimation.

In certain embodiments, Doppler dealiasing is applied to resolve the ambiguity of a range-Doppler detection, and phase compensation is then applied to reconstruct array measurements. The dealiasing may be achieved by assigning a unique pulse repetition frequency (PRF) to each transmitter and combining the transmissions in a TDM chirp transmission sequence to form a single transmission frame. On receiving reflections of the transmissions, the Doppler spectrum of each transmitter may be computed and unrolled to multiple ±2π's extent. A correct Doppler shift or radial velocity detection may be identified as a peak position where transmitter peaks (e.g., most or all) are above a detection threshold and aligned. Incorrectly unrolled radial velocity detections result in misaligned peaks and can be identified (e.g., and ruled out). In some implementations, this approach is carried out using single-frame processing and utilizing arbitrary number of transmitters to be used for TDM MIMO virtual array construction. This approach may also be implemented with multiple-target scenarios in which some or all targets may have a different interger-2π Doppler/radial velocity ambiguity. Various MIMO virtual array geometries may be utilized.

Certain embodiments are directed to implementations involving a fast chirp radar system in which a target's Doppler shift or radial velocity is estimated by sampling in slow time over multiple chirps. After range FFT processing, for each range cell across the slow time or the sequence of chirps, another FFT is applied to construct the Doppler shift spectrum. Target detection may be performed based on the obtained range Doppler map. As the sampling in slow-time is discrete and has its sampling interval determined by the pulse repetition interval (PRI, as a time duration between two adjacent chirps transmitted by the same TDM transmitter), the spectrum is periodic in the Doppler shift or radial velocity domain and a 2π period is inversely related to the PRI based on the following relationships, where f(D,2π) is the 2π Doppler shift; V(r,2π) is the 2π-radial velocity; C is the speed of light; fc is the carrier frequency; and λ is the wavelength:

$$f_{D,2\pi} \equiv \frac{1}{PRI} = \frac{2V_{r,2\pi}fc}{C} = \frac{2V_{r,2\pi}}{\lambda} \to V_{r,2\pi} \equiv \frac{\lambda}{2*PRI}$$

Radial velocity may be unambiguously described within the 0 to 2π spectrum region (e.g., between 0 and V(r,2π) [m/s]), as velocity outside this region may be folded when attempting to measure it. The observable radial velocity, V(r,obs), is the modulo-2π of the true velocity, Vr0, based on the following relationship where mod(·) denotes the modulo operation:

$$V(r,obs) = \mathrm{mod}(Vr0, V(r,2\pi)).$$

In a particular embodiment, in a first step, distinct PRI values are assigned to the transmitters resulting in distinct 2π-radial velocities (V(r,2π,i)) for the transmitter. Denote V(r,2π,i) as the 2π-radial velocity corresponding to transmitter-i. As a result, radial velocities greater than V(r,2π,i) fold onto the modulo-2π spectrum at different observable velocity for distinct transmitter-i's. The chirp sequences may be arranged such that they don't result in overlapped chirp transmissions, with one transmitter being allowed to transmit in TDM MIMO. This constraint is satisfied and the PRI values may not be arbitrary.

In a second step, for each transmitter the modulo-2π spectrums are unfolded into multiple ±2π extent (for example ±4π, ±6π, ±8π, . . . ). The true target radial velocity, if it falls within the unfolded extent, may show up in the same radial velocity across all transmitters' spectrums. In this case, the Doppler spectrums may have peaks aligning at the same position and in contrast, the peaks are misaligned for incorrectly unfolded velocity.

In a third step, aligned spectral peaks in the unfolded spectrums are identified and used to resolve the ambiguity of radial velocity measurements. For example, the following relationship may be utilized, where m is an integer (e.g., m∈ {0,±1,±2, . . . }), $$Vr0 = V(r,obs) + m*V(r,2\pi)$$

The correct radial velocity Vr0 occurs in the m*2π to (m+1)*2π section of the unfolded spectrum and observed as aligned peaks at the spectrum position corresponding to Vr0.

As characterized herein, unwrapping a spectrum may be carried out based on signal processing theory, in which the spectrum of a discretely sampled signal is periodic in nature and has unambiguously describable frequency range between 0 [Hz] and Fs [Hz] where Fs is the sampling frequency, or one over the sampling interval. This may be referred to as a 2π spectrum of a signal in which its 2π radian corresponds to Fs. The true spectrum of a discretely sample signal may be an infinitely repeated spectrum of the 2π spectrum, which may be referred to as an infinitely unwrapped spectrum or unrolled spectrum. Where the sampling frequency is not fast enough to describe a signal's frequency components in an under-sampling condition, ambiguity may occur and the true frequency component may show up in the 0 to Fs (or 0 or 2π) spectrum in modulo-Fs (or modula-2π) fashion. By unwrapping the 2π spectrum a sufficient number of times, one of the unwrapped spectrum components may correspond to the correct frequency.

Ambiguities that may be present (e.g., due to undersampling), an unwrap spectrum that contains the correct frequency component can be resolved, for example by sampling the signal with a different Fs values and producing unwrapped spectrums. In each of the sufficiently unwrapped spectrums, one of all ambiguous unwrapped spectrum components may correspond to the true frequency. As a result, one may expect to find the correctly unwrapped spectrum component to line up across all unwrapped spectrums, and find incorrectly unwrapped spectrum components as those that do not line up across all unwrapped spectrums.

In the context of FMCW Doppler radar, the sampling of the target's Doppler signal may be achieved by sending chirp signals in regular intervals that correspond to the sampling intervals (referring to pulse repetition interval or PRI). One over such interval may correspond to a maximum positive unambiguous Doppler shift that the system can unambiguously describe. If the chirp interval is not short enough to result in high enough sampling frequency to describe a target's maximum Doppler shift due to fast relative motion, other chirp interval values may be used to sample the target's Doppler signal. Multiple-PRI sampling may be carried out with a fused-PRF chirp sequence in which chirp sequences of different transmitters (TX) are interleaved and processed as a single frame, with the results coherently combined. This may be used to resolve the Doppler ambiguity and/or with different transmitters, each corresponding to its unique PRI (or PRF) value.

In certain implementations, every spectrum sample may not be unfolded or unwrapped to form an extended ±inter-$2\pi$ spectrum to identify the overlapped or aligned peaks. This may be carried out for detected spectrum peaks (e.g., which are samples above a detection threshold and with magnitude higher than its two adjacent neighbors), to conserve computing power.

In accordance with a more particular embodiment, an apparatus includes transmission, receiver and processing circuitry. The transmission circuitry transmits time division multiplexing (TDM) multi-input multi-output (MIMO) radar signals by transmitting sets of successive radar signals, each set having a pulse repetition interval (PRI) that is different than the PRI of sets of radar signals transmitted in another one of the sets. The transmission circuitry may include, for example, a plurality of transmitters in which each transmitter is operative for transmitting one of the sets of successive radar signals using a PRI that is different than a PRI used by other ones of the transmitters. The processing circuitry ascertains positional characteristics of the target based on the PRI used in each of the sets and on phase characteristics of ones of the radar signals reflected from the target and received via the receiver circuitry.

The processing circuitry may be implemented in a variety of manners. In some implementations, the processing circuitry ascertains the positional characteristics by applying phase compensation to the reflected signals based on the PRI used in each of the sets and the phase characteristics. The processing circuitry may apply phase compensation to the reflected signals by resolving radial velocity of the respective signals, including selecting peaks of the reflected signals that overlap one another. In this context, selecting the peaks of the reflected signals may include selecting peaks having a position and magnitude that overlaps peaks in unwrapped spectrums of other ones of the reflected signals illuminated by other transmitters.

In certain embodiments, the processing circuitry may apply phase compensation to the reflected signals by unwrapping spectrum samples from the reflected signals and forming an extended ±inter-$2\pi$ spectrum, and by identifying aligned peaks in the unwrapped spectrum samples. Power may be conserved by selecting the spectrum samples as spectrum peaks that are above a detection threshold value and having a magnitude higher than adjacent peaks.

In particular embodiments, the processing circuitry may apply phase compensation to the reflected signals by estimating radial velocity of the reflected radar signals, and using the estimated radial velocity to compensate for phase error in the reflected radar signals. The radial velocity may be estimated based on correspondence between spectrum peaks in the reflected radar signals received from different ones of the transmitters.

In certain embodiments, the processing circuitry may estimate radial velocity of the reflected signals by detecting velocity and magnitude of peaks in the reflected radar signals. The estimated radial velocity may be determined based on associated ones of the detected peaks in unwrapped ones of the spectrums, and/or in response to detecting peaks in the reflected radar signals that correspond to peaks in all of the other reflected radar signals.

Another embodiment is directed to a method as follows. Time division multiplexing (TDM) multi-input multi-output (MIMO) radar signals are transmitted by transmitting sets of successive radar signals, each set having a pulse repetition interval (PRI) that is different than the PRI of sets of radar signals transmitted in another one of the sets. For instance, respective ones of the sets of successive radar signals may be transmitted using a plurality of transmitters, each transmitter using a PRI that is different than a PRI used by other ones of the transmitters. Positional characteristics of a target are ascertained based on the PRI used in each of the sets and on phase characteristics of ones of the radar signals reflected from the target.

Phase compensation may be applied in a variety of manners. In some embodiments, phase compensation is applied to the reflected signals based on the PRI used in each of the sets and the phase characteristics to ascertain the positional characteristics. Phase compensation may be applied by resolving radial velocity of the respective signals, including selecting peaks of the reflected signals that overlap one another. In this context, selecting the peaks of the reflected signals may include selecting peaks having a position and magnitude that overlaps peaks in unwrapped spectrums of other ones of the reflected signals illuminated by other transmitters.

In some implementations, phase compensation may be applied to the reflected signals by unwrapping spectrum samples from the reflected signals and forming an extended ±inter-$2\pi$ spectrum, and by identifying aligned peaks in the unwrapped spectrum samples. Power may further be conserved by selecting the spectrum samples as spectrum peaks that are above a detection threshold value and having a magnitude higher than adjacent peaks.

In a particular embodiment, phase compensation is applied to the reflected signals by estimating radial velocity of the reflected radar signals based on correspondence between spectrum peaks in the reflected radar signals received from different ones of the transmitters. The estimated radial velocity may then be used to compensate for phase error in the reflected radar signals Turning now to the figures, FIG. 1 shows a radar apparatus 100, as may be implemented in accordance with one or more embodiments. The apparatus 100 includes an antenna array 110, radar communication circuitry 120, and radar processing circuitry 130 (which may further interface with interface circuitry 140, for example automotive interface circuitry). The antenna array 110 includes a plurality of antennas, and the radar communication circuitry 120 includes transmission circuitry 122 and reception circuitry 124 (e.g., a plurality of transmitters and receivers). The radar processing circuitry 130 (e.g., radar MCPU) includes a controller module 132 and PRI-based positional assessment circuitry 134.

These components of apparatus 100 are operable to provide TDM, MIMO radar communications, in connection with signals communicated with the radar processing circuitry 130, utilizing variable PRIs and as may be implemented in accordance with one or more embodiments herein. For instance, positional characteristics of a target from which radar signals transmitted by the transmission circuitry 122 via the antenna array 110 and having disparate PRIs, and which are reflected from the target and received by the reception circuitry via the antenna array, may be ascertained based on the PRI used in each set of radar signals and phase characteristics of the reflected signals. In certain embodiments, the transmission circuitry 122 and reception circuitry 124 are respectively implemented in accordance with the transmitter and receiver circuitry as characterized in communication circuitry 220 in FIG. 2.

Figure 2:
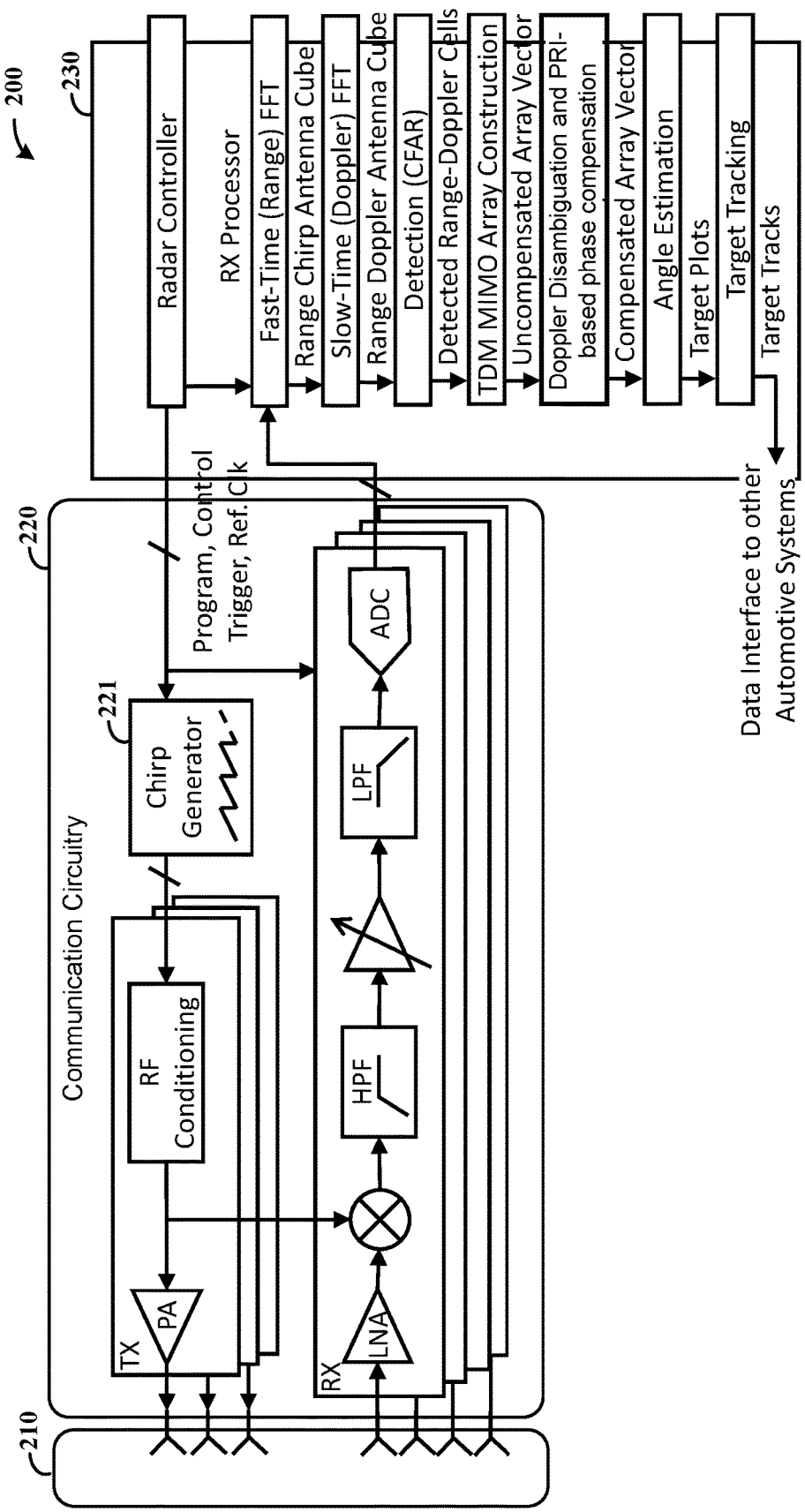
FIG. 2 shows notional a radar apparatus 200 with PRI-based phase compensation, in accordance with the present disclosure.

FIG. 2 shows notional TDM MIMO linear-chirp FMCW radar apparatus 200 with PRI-based phase compensation, as may be utilized for example with 76~81 GHz FMCW automotive radar systems. The apparatus 200 includes an antenna array 210, communication circuitry 220 and radar processing circuitry 230, and is operable to transmit successive sets of radar signals using variable PRIs and to utilize this variation to effect phase compensation. The communication circuitry 220 includes a plurality of transmitters and receivers (e.g., three transmitters and four receivers). The transmitters may include a chirp generator 221 operable to generate respective chirps at variable PRIs, and may include other transmission circuitry such as conditioning and amplifier circuits, and operate in response to radar control circuitry within the radar processing circuitry 230.

The receivers may include amplifier, filtering and other circuits as useful for receiving radar signals. For instance, each receiver may mix a return radar reflection with a transmitted chirp and filter the result to generate deramped IF (intermediate frequency) signals to be sampled by analog-to-digital converters (ADCs) and processed by a digital signal processing (DSP) unit to produce range and Doppler responses for each receive channel. For TDM MIMO, multiple transmitters may transmit signals of varying PRIs in sequence so each signal can be separately received at all receivers. The range-Doppler response maps of the receivers from the transmitted signals may be aggregated to form a complete MIMO array measurement data cube consisting of range-Doppler response maps of antenna elements of a constructed MIMO virtual array. The range-Doppler responses may be non-coherently integrated and target detection may be attempted on the energy-combined range-Doppler map. A detection algorithm, such as may relate to variants of the CFAR algorithm, may be used to identify the range-Doppler cells in which targets may be present. For each detection cell, the array measurement vector may then be extracted and processed for identifying the incident angles of any target returns contained in the cell. The transmitters in communication circuitry 220 may set starting positions of each transmitters' first chirps with distinct offsets (e.g., with different and non-uniform PRIs).

Reflected radar signals received via the antenna array 210 and communication circuitry 220 are passed to the radar processing circuitry 230. The received signals are processed accordingly by utilizing the PRI variation for Doppler disambiguation and PRI-based phase compensation as part of signal processing steps/functions, and generates an output array vector with phase compensation. The radar processing circuitry 230 may further carry out angle estimation and target tracking, using the compensated output array vectors, for tracking positional characteristics of targets from which reflections are received. Such target information may further be provided via a data interface to external systems, such as automotive systems.

Figure 3A:
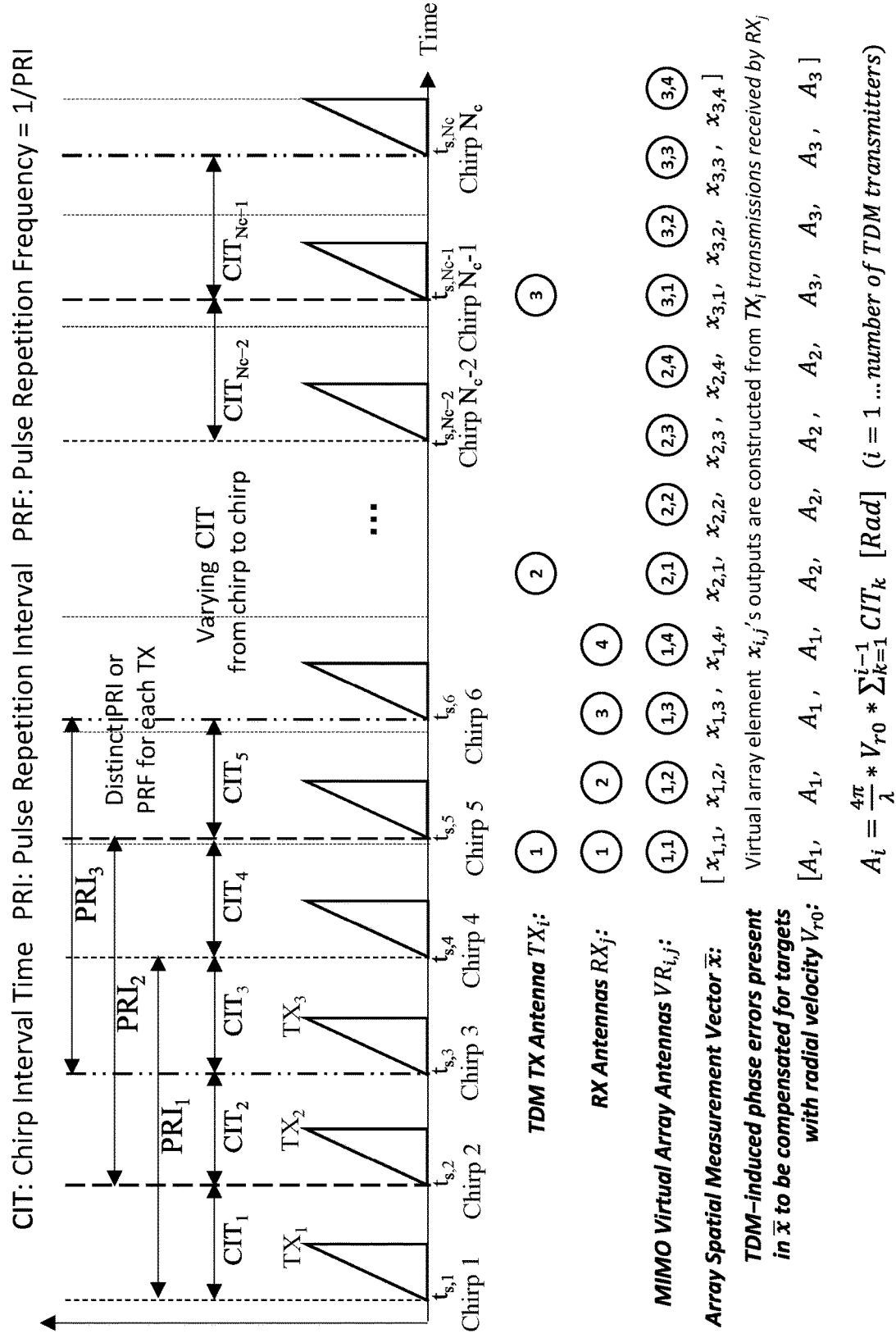
FIG. 3A shows an example chirp transmission schedules, as may be implemented in accordance with the present disclosure.

FIG. 3A shows an example 3-TX 4-RX TDM MIMO chirp transmission schedule with fused PRF's, array geometry and resulting MIMI array and array output containing phase errors. Transmissions may be carried out one transmitter at a time, or with groups of transmitters transmitting at same time, with each transmitter using a different PRF relative to the other transmitters. The chip starts as shown are all different, with the PRI being different for each, resulting in the chirp interval time (CIT) of each transmitter also being different. PRI may be the same for chirps of the same transmitter or the same group of transmitters (if so grouped).

Figure 3B:
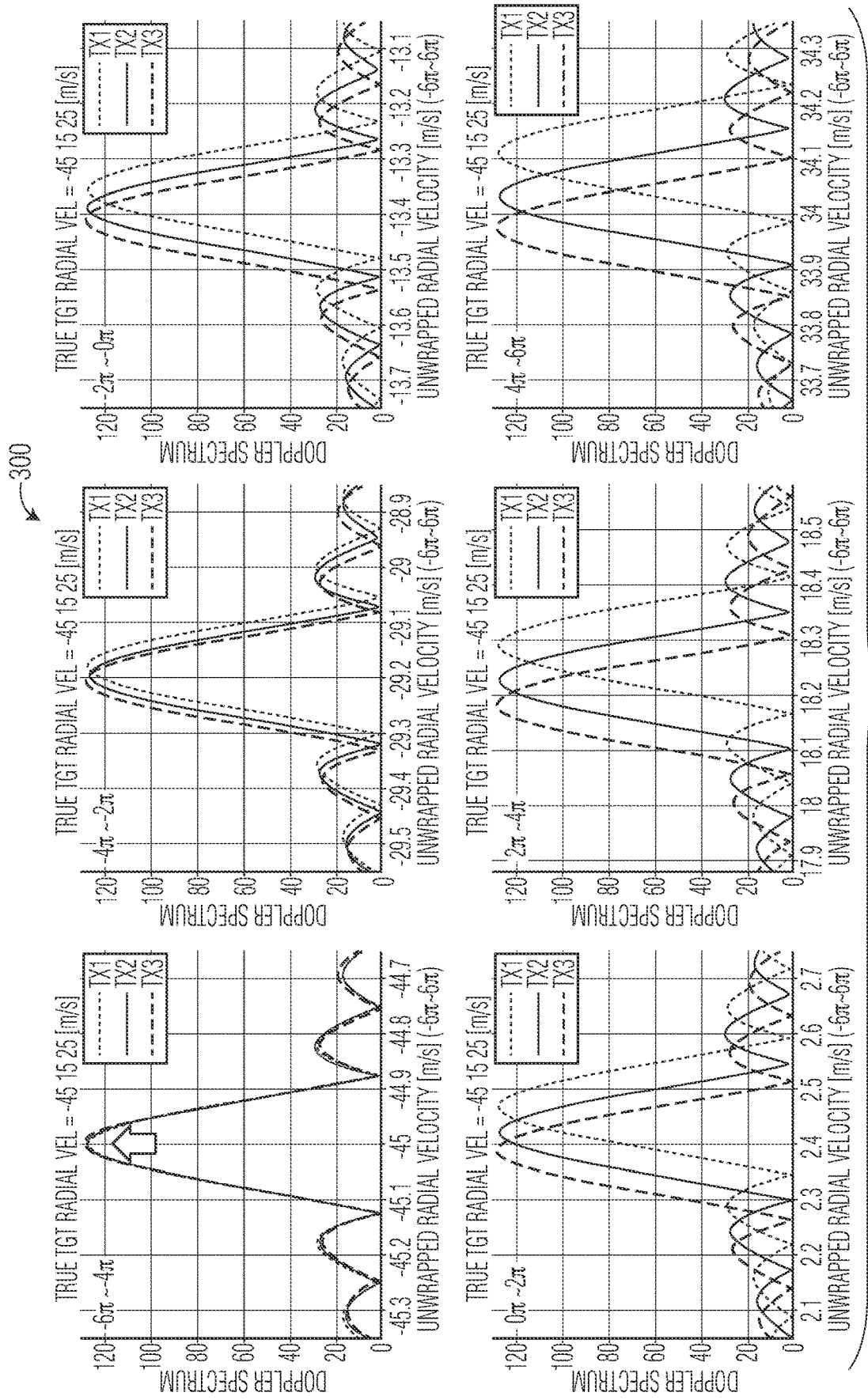
FIG. 3B shows example peak alignment detection, as may be implemented in accordance with the schedules shown in FIG. 3A and/or otherwise in accordance with the present disclosure.

Reflections of these chirps are received and processed with phase compensation, in accordance with one or more aspects characterized herein. FIG. 3B shows plots corresponding to unwrapped radial velocity of reflections from a target, as may be implemented with FIG. 3A to identify correct radial velocity via consistency. In this instance, plot 300 depicting an unwrapped radial velocity of −45 [m/s] for an overlapping peak of each of three received sets of reflections from three transmitters, relative to the various other plots in which corresponding ambiguous velocities have peaks misaligned. Consequently, a target with −45 [m/s] resolved velocity is detected and the velocity is used for computing the correct phase error compensation (Aî) in the MIMO array vector of this range-Doppler cell. A similar approach may be carried out for additional targets.

Referring again to FIG. 3A, each transmitter has a unique PRI. The first transmitter's constant PRI is PRI1=CIT1+CIT2+CIT3, the second transmitter's constant PRI is PRI2=CIT2+CIT3+CIT4, and the third transmitter's constant PRI is PRI3=CIT3+CIT4+CIT5. Owing to the difference in the PRI, the CIT from chirp to chirp also varies and thus are non-uniform. By implementing the multiple PRIs in a single frame, for instance by fusing multiple PRF's within a single frame, the Doppler ambiguity may be resolved within a single frame in which the selection of PRI can play an important role.

Ambiguity in the unfolded spectrum may be mitigated and/or avoided by choosing PRFs (or V(r,2π) values) such that one PRFi (or V(r,2π,i)) value or is not a factor of the other PRFj≠i (V(r,2π,j≠i)). For example, random non-integer values and co-prime integer values (greatest common divisor of these values is 1) may be used as candidates for designing PRFs or V(r,2π) values that does not easily result in ambiguous unwrapped spectrums.

In a fourth step, based on the estimated radial velocity as noted above, the amount of phase error corresponding to transmitter-i, $\hat{A}_i$, can be estimated using the following equation, where $\hat{V}_{r0}$ is the estimated radial velocity with ambiguity resolved. To increase the accuracy, the Doppler peaks of different transmitters may be interpolated to be resampled on common grid points before being used for angle estimation.

$$\hat{A}_i = \frac{4\pi}{\lambda} * \hat{V}_{r0} * \sum_{k=1}^{i-1} CIT_k \; [Rad]$$

Once the unambiguous radial velocity is resolved, correct phase compensation can be applied to an MIMO array output vector. For example, for a 3-TX 4-RX TDM MIMO system depicted in FIG. 3A, the virtual array output vector x can be written as follows, where an element xi,i is obtained as the i-th receiver's output when the i-th transmitter is transmitting:

$$x=[x_{1,1},x_{1,2},x_{1,3},x_{1,4},x_{2,1},x_{2,2},x_{2,3},x_{2,4},x_{3,1},x_{3,2},x_{3,3},x_{3,4}]$$

Due to the nature of TDM, the chirp sequence's starting time may differ from one transmitter to another. For example in FIG. 3A, the first transmitter may start in t=0, the second transmitter may start at t=CIT1, and the third transmitter may start at t=CIT2, where CITk denotes the chirp duration between the k-th chirp and its immediate next chirp (of a different transmitter). Therefore, all array elements' outputs obtained from transmitter-i's chirps may include a common motion-induced phase error term, Ai. The value of Ai can be computed using the following equation:

$$A_i = \frac{4\pi}{\lambda} * V_{r0} * \sum_{k=1}^{i-1} CIT_k \, [Rad]$$

(i = 1 ... N, the number of TDM transmitters)

In a particular use-case scenario, an approach as depicted with FIGS. 3A and 3B may be realized for example with a chirp sequence starting time of transmitters 1, 2, and 3 of 0 μs, 30 μs, and 60 μs, respectively, with the PRI's of transmitters 1, 2 and 3 being 120,000 ns, 120,117 ns and 120,205 ns, respectively. The respective 2π-radial velocity are (rounded to the 4-th decimal place, fc selected to be 79 GHz for example), 15.8228, 15.8074, and 15.7958 [m/s] respectively. Each transmitter transmits 128 chirps, so the entire frame includes 384 chirps. The PRI's and chirp starting time may be designed so that none of the chirps are overlapped with a minimum chirp duration of 30 μs (including active acquisition period and down time). Three targets may be simulated in a range cell and the Doppler (or radial velocity) spectrums may be computed based on the range cell's output across 128 chirps for each transmitter. The obtained modulo-2π spectrums are unwrapped or unfolded to ±6π extend for aligned-peak detection. This approach may be extended to include an arbitrary number of transmitters as well as an arbitrary number of chirps provided a non-overlapping chirp transmission constraint is met. Further, the method may be agnostic to array geometry.

Figure 4:
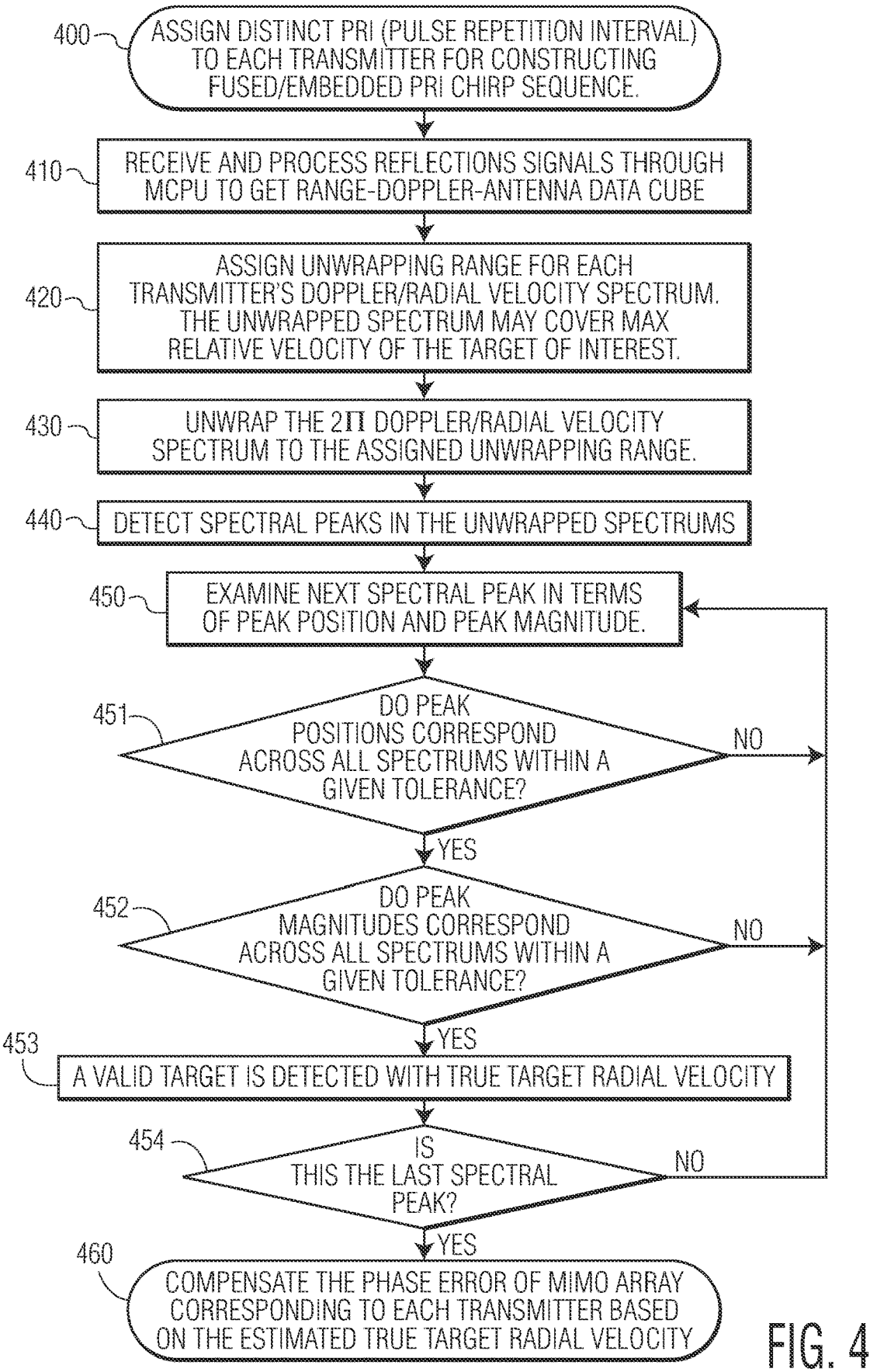
FIG. 4 shows a flow diagram for PRI-based phase compensation, in accordance with the present disclosure.

FIG. 4 shows a flow diagram for PRI-based phase compensation, in accordance with the present disclosure. At block 400, distinct PRI values are assigned to respective transmitters for constructing a fused/embedded PRI chirp sequence. Co-prime PRIs values may be used. Reflection signals are received and processed at block 410 through a radar MCPU to get a Range-Doppler-Antenna data cube. An unwrapping range is assigned at block 420 for each transmitter's Doppler/radial velocity spectrum. The unwrapped spectrum may cover a maximum relative velocity of the target of interest. At block 430, the 2π Doppler/radial velocity spectrum is unwrapped to an assigned unwrapping range and spectral peaks are detected in the unwrapped spectrums at block 440. The spectral peaks in each Doppler spectrum are examined at block 450 in terms of peak position and peak magnitude. If the peak positions and magnitudes correspond across all spectrums within a given tolerance at block 451 and block 452, a valid target is detected at block 453 and its true target radial velocity is identified. If either the peak positions or magnitudes do not correspond at block 451 and block 452, the process reverts to block 450. After valid targets are detected at block 453, and if the target is the last spectral peak at block 454, the phase error of an MIMO array corresponding to each transmitter is compensated based on the estimated true target radial velocity. If additional spectral peaks are to be processed at block 454, the process resumes at block 450.

Figure 5:
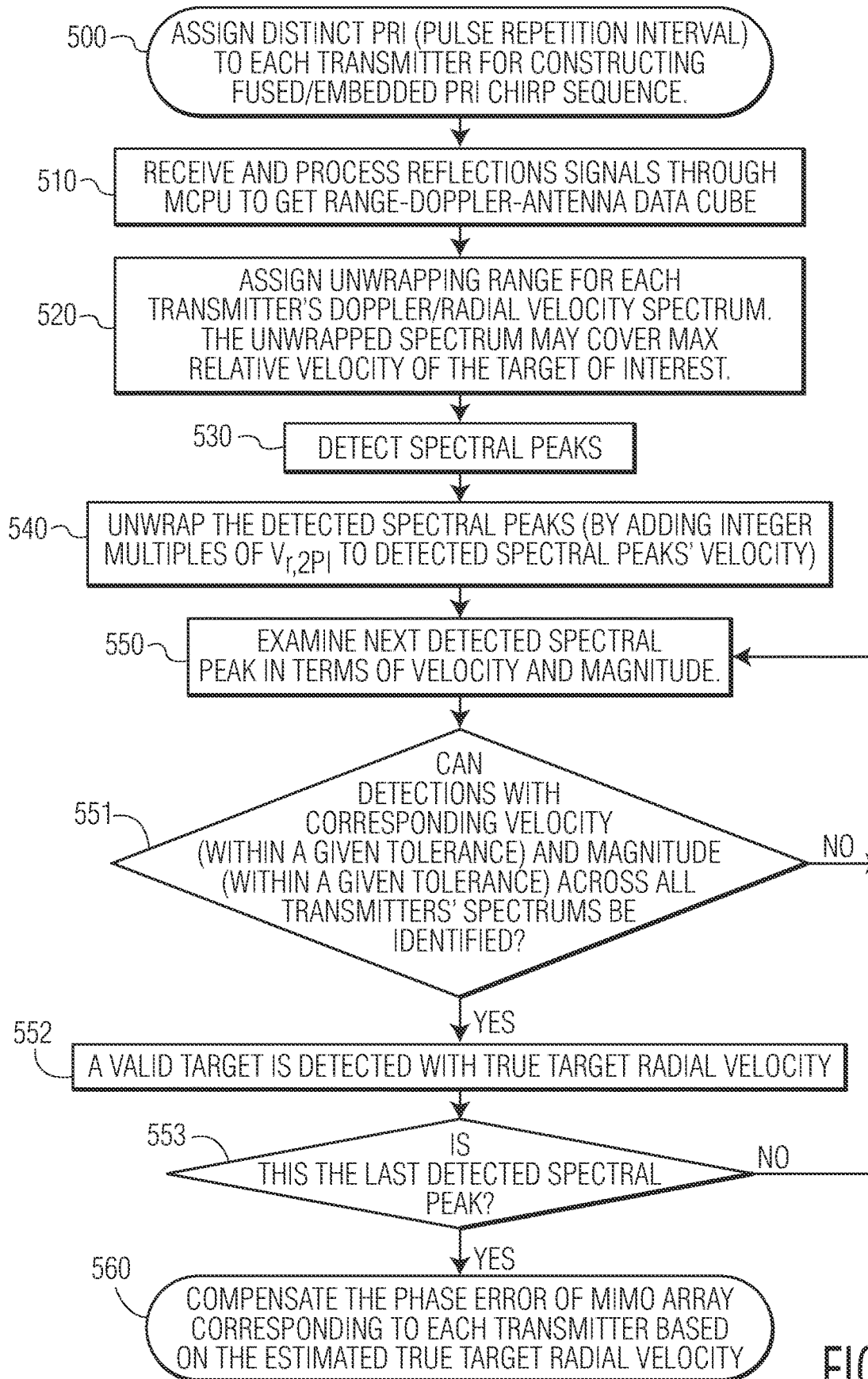
FIG. 5 shows a flow diagram for another approach to PRI-based phase compensation, in accordance with the present disclosure.

FIG. 5 shows a flow diagram for another approach to PRI-based phase compensation, in accordance with the present disclosure. A distinct PRI is assigned to respective transmitters at block 500 for constructing a fused/embedded PRI chirp sequence, which may utilize co-prime PRI values. Signal reflections are received and processed through a radar MCPU at block 510 to obtain a Range-Doppler-Antenna data cube. An unwrapping range for each transmitter's Doppler/radial velocity spectrum is assigned at block 520, in which the unwrapped spectrum may cover max relative velocity of the target of interest. Spectral peaks are detected at block 530 and unwrapped at block 540, for instance by adding integer multiples of V(r,2π) to detected spectral peaks' velocity. The detected spectral peaks in each Doppler spectrum are examined at block 550 in terms of peak position and peak magnitude. If detections with corresponding velocity (within a given tolerance) and magnitude (within a given tolerance) across all transmitters' spectrums can be identified at block 551, a valid target is detected with true radial velocity at block 552. If corresponding velocity and magnitude are not detected at block 551, the process resumes at block 550. Once a valid target is detected, and if that valid target is a last detected spectral peak at block 553, the phase error of an MIMO array corresponding to each transmitter is compensated at block 560 based on the estimated true target radial velocity. The process otherwise resumes at block 550 if additional spectral peaks are to be processed.

As examples, the Specification describes and/or illustrates aspects useful for implementing the claimed disclosure by way of various circuits or circuitry which may be illustrated as or using terms such as blocks, modules, device, system, unit, controller, transmitter, receiver, radar circuitry, and/or other circuit-type depictions (e.g., reference numerals 120, 122, 124, 130, 132 and 134 of FIG. 1, and 220, 221, and 230 of FIG. 2 may depict a block/module as described herein). Such circuits or circuitry are used together with other elements to exemplify how certain embodiments may be carried out in the form or structures, steps, functions, operations, activities, etc. As examples, wherein such circuits or circuitry may correspond to logic circuitry (which may refer to or include a code-programmed/configured CPU), in one example the logic circuitry may carry out a process or method (sometimes "algorithm") by performing pulse repetition and/or PRI-based positional assessment, and in another example, the logic circuitry may carry out a process or method by performing these same activities/operations. Yet another process or method in this context would be recognized in connection with the functions/activities associated with the steps shown in FIGS. 4 and 5.

For example, in certain of the above-discussed embodiments, one or more modules are discrete logic circuits or programmable logic circuits configured and arranged for implementing these operations/activities, as may be carried out in the approaches shown in FIGS. 3-5. In certain embodiments, such a programmable circuit is one or more computer circuits, including memory circuitry for storing and accessing a program to be executed as a set (or sets) of instructions (and/or to be used as configuration data to define how the programmable circuit is to perform), and an algorithm or process as described in connection with one or more of FIGS. 3-5 or otherwise herein is used by the programmable circuit to perform the related steps, functions, operations, activities, etc. Depending on the application, the instructions (and/or configuration data) can be configured for implementation in logic circuitry, with the instructions (whether characterized in the form of object code, firmware or software) stored in and accessible from a memory (circuit).

Based upon the above discussion and illustrations, those skilled in the art will readily recognize that various modifications and changes may be made to the various embodiments without strictly following the exemplary embodiments and applications illustrated and described herein. For example, methods as exemplified in the Figures may involve steps carried out in various orders, with one or more aspects of the embodiments herein retained, or may involve fewer or more steps. As another example, adjustments may be made to PRIs as used, with similar effects achieved. Such modifications do not depart from the true spirit and scope of various aspects of the disclosure, including aspects set forth in the claims

What is claimed is:

1. An apparatus comprising:
    transmission circuitry configured to transmit time division multiplexing (TDM) multi-input multi-output (MIMO) radar signals by transmitting sets of radar signals in accordance with a TDM chirp transmission sequence to form a single transmission frame in which the sets of radar signals are interleaved, each of the transmitted sets of radar signals having respectively different pulse repetition intervals (PRI), wherein each of the sets of radar signals includes at least three radar signals, wherein the transmission circuitry includes a plurality of transmitters, each transmitter configured to transmit one of the sets of radar signals using a respective PRI that is different from PRIs used by other transmitters of the plurality of transmitters;
    receiver circuitry configured to receive reflected radar signals reflected from a target; and
    processing circuitry configured to ascertain positional characteristics of the target based on respective PRIs used in the transmitted sets of radar signals and on phase characteristics of the reflected radar signals, wherein the processing circuitry is configured to:
    estimate radial velocity of the target based on peaks of the reflected signals;
    apply phase compensation to the reflected signals based on the estimated radial velocity;
    unwrap spectrum samples from the reflected signals; and
    form an extended ±inter-2π spectrum, wherein the peaks used to estimate the radial velocity of the target correspond to aligned peaks in the unwrapped spectrum samples.

2. The apparatus of claim 1, wherein the processing circuitry is configured to ascertain the positional characteristics by applying phase compensation to the reflected signals based on the PRI used in each of the sets and the phase characteristics.

3. The apparatus of claim 1, wherein each of the peaks used to estimate the radial velocity of the target has position and magnitude that overlaps one or more other peaks of the reflected signals.

4. The apparatus of claim 1, wherein the peaks used to estimate the radial velocity of the target are above a detection threshold value and have a magnitude higher than adjacent peaks.

5. A method comprising:
    transmitting time division multiplexing (TDM) multi-input multi-output (MIMO) radar signals by transmitting sets of radar signals having respectively different pulse repetition intervals (PRIs) in accordance with a TDM chirp transmission sequence to form a single transmission frame in which the sets of radar signals are interleaved, wherein each of the sets of radar signals includes at least three radar signals;
    ascertaining positional characteristics of a target based on respective PRIs of each of the transmitted sets of radar signals and on phase characteristics of corresponding radar signals reflected from the target, wherein ascertaining the positional characteristics comprises:
        applying phase compensation reflected signals based on the PRI used in each of the transmitted sets of radar signals and the phase characteristics of the corresponding radar signals reflected from the target, when applying the phase compensation to the reflected signals comprises:
            estimating radial velocity of the target based on peaks of the reflected signals; and
            applying the phase compensation to the reflected signals based on the estimated radial velocity; and
        unwrapping spectrum samples from the reflected signals; and
        forming an extended ±inter-2π spectrum, wherein the peaks used to estimate the radial velocity of the target correspond to aligned peaks in the unwrapped spectrum samples.

6. The method of claim 5, wherein transmitting includes transmitting the sets of radar signals with a plurality of transmitters, each of the plurality of transmitters using a respective PRI that is different from PRIs used by other transmitters of the plurality of transmitters.

7. The method of claim 5, wherein each of the peaks used to estimate the radial velocity of the target has a position and magnitude that overlaps one or more other peaks of the reflected signals.

8. The method of claim 5, wherein the peaks used to estimate the radial velocity of the target are above a detection threshold value and have a magnitude higher than adjacent peaks.

* * * * *